United States Patent [19] [11] Patent Number: 4,977,405
Nothnick [45] Date of Patent: Dec. 11, 1990

[54] PROGRAMMABLE IF CLUTTER CANCELLER

[75] Inventor: Carl E. Nothnick, Pasadena, Md.

[73] Assignee: Westinghouse Elecric Corp., Pittsburgh, Pa.

[21] Appl. No.: 469,971

[22] Filed: Jan. 25, 1990

[51] Int. Cl.$^5$ .......................................... G01S 13/538
[52] U.S. Cl. .................................... 342/162; 342/159
[58] Field of Search ................ 342/159, 160, 162, 163

[56] References Cited

U.S. PATENT DOCUMENTS

| | | | |
|---|---|---|---|
| 3,417,396 | 10/1968 | Stifter et al. ..................... | 342/160 X |
| 3,716,859 | 2/1973 | Webb et al. ...................... | 342/159 X |
| 3,765,017 | 10/1973 | Dentino ........................... | 342/163 X |
| 3,787,852 | 1/1974 | Puckette et al. ................. | 342/163 X |
| 4,023,170 | 5/1977 | Buss ................................ | 342/160 X |
| 4,053,884 | 10/1977 | Cantrell et al. ................. | 342/160 X |

OTHER PUBLICATIONS

Ludington et al., "Charge-Transfer Devices Replace Conversion in Moving Target Indicators", Electonics, vol. 99, No. 10, pp. 98-102, May 13, 1976.

Primary Examiner—Gilberto Barrón, Jr.
Attorney, Agent, or Firm—J. K. Williamson

[57] ABSTRACT

An IF Clutter Canceller using delay lines and acoustic charge transport (ACT) devices to subtract one interpulse period from another interpulse period. The first interpulse period is time demultiplexed with a tapped delay line and stored in ACT devices. The second interpulse period is time demultiplexed through the same delay line as was the first interpulse period. The stored time segments of the first interpulse period are released from the ACT devices and subtracted from the time demultiplexed time segments of the second interpulse period. The resulting clutter cancelled time segments are then assembled into a clutter cancelled interpulse period with a second tapped delay line.

9 Claims, 3 Drawing Sheets

PREFERRED EMBODIMENT

SINGLE POLE CLUTTER CANCELLER

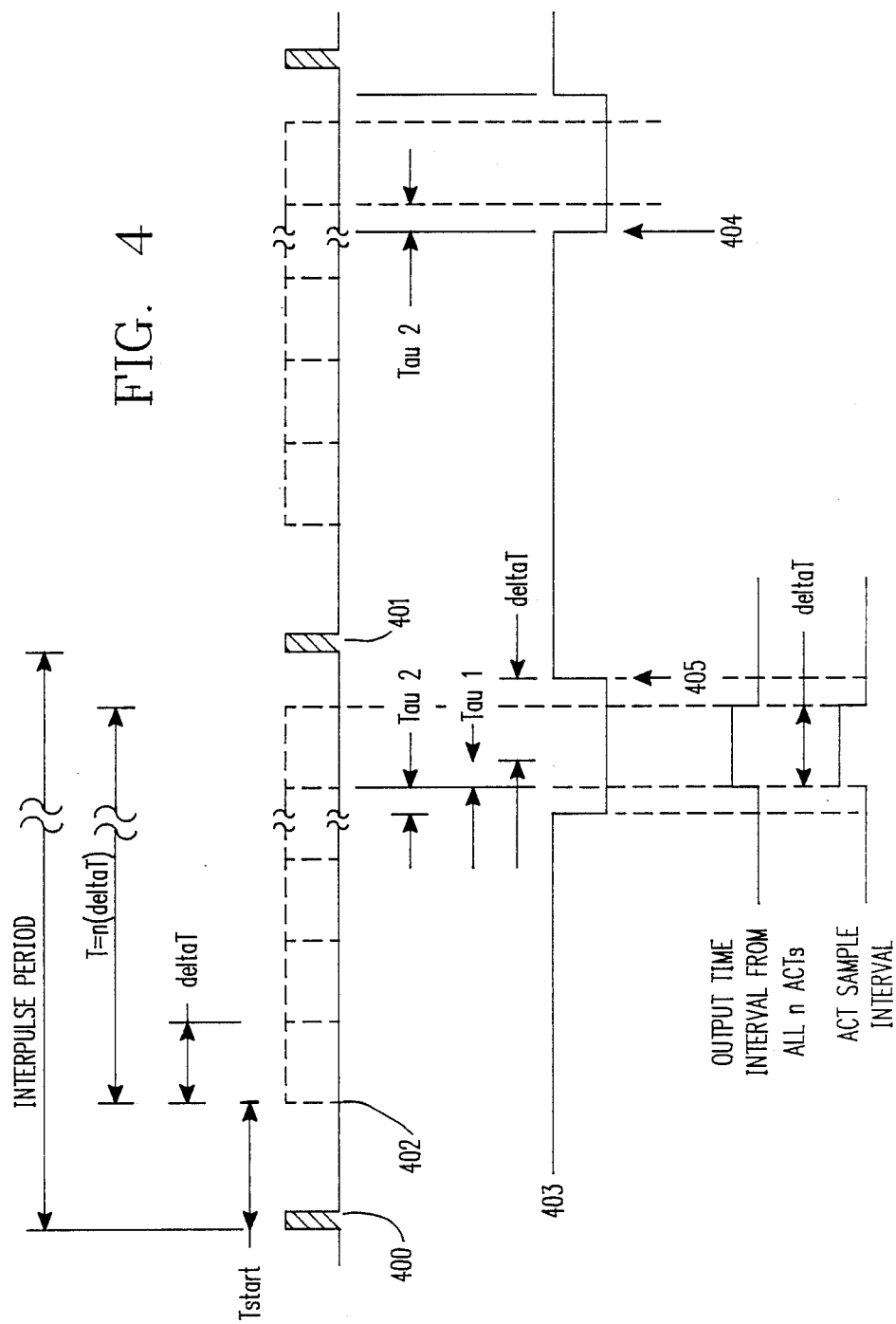

PROGRAMMABLE IF CLUTTER CANCELLER

BACKGROUND OF THE INVENTION

1. Field of the Invention

This invention relates to radar systems utilizing Moving-Target-Indication (MTI) for signal detection. More particularly, this invention relates to an arrangement useful for attenuating clutter echoes of fixed targets (non-doppler shifted) to reveal the echoes of a moving target (doppler shifted).

2. Description of Related Art

The receiver of an MTI radar system receives large non doppler-shifted return echoes from stationary objects in addition to receiving doppler-shifted return echoes from targets of interest. These non doppler-shifted return echoes are referred to as "clutter". An A/D converter typically digitizes the output of the receiver and a system processor uses digital filtering techniques to separate the doppler-shifted target echo from the non doppler-shifted clutter.

The magnitude of the clutter signal, however, often exceeds the magnitude of the target return signal by as much as 90 dB. The ensuing problem is that it is difficult to achieve the receiver linearity (in the form of intermodulation suppression) and the A/D converter dynamic range (in terms of number of bits in the output) necessary to recognize doppler shifted echoes amid the clutter. If it were possible to reject the non-doppler shifted clutter before the receiver amplifies the signal and before the A/D converter digitizes the receiver output, the stringent requirements on receiver linearity and A/D dynamic range could be relaxed. Each additional 6 dB of clutter rejected before A/D conversion would reduce the required number of A/D output bits by one.

FIG. 1 depicts a single pole clutter canceller described by Skolnik in "Introduction to Radar Systems". This clutter canceller utilizes delay line 103 to remove clutter at IF and before A/D conversion. A radar IF input signal 100 is split by power divider 102 into two signals. One of the signals is put through delay line 103 before being supplied to combiner 104. The other signal is put directly to combiner 104. Combiner 104 subtracts one of the signals from the other to output the resulting clutter cancelled IF output signal 101.

Note that delay line 103 has a propagation delay precisely equal to the amount of time between successive radar pulse transmissions. This period of time is referred to as the interpulse period. Delay line 103 delays the return echo from a first interpulse period for precisely one interpulse period of time. This delayed echo is then subtracted from the next return echo received by the radar receiver in the next interpulse period.

Because the clutter component of the return echo contains no doppler shift, it has the same phase from one interpulse period to the next. Subtraction of one interpulse period from the next, therefore, results in the cancellation of the clutter component. The target return component of the return echo, however, contains a doppler shift and a phase difference exists between target return components of different interpulse periods. Subtraction of one interpulse period from the next, therefore, does not result in cancellation of the target return component. This occurs because the IF center frequency at which subtraction takes place is an integer multiple of the system pulse repetition interval (reciprocal of interpulse period). If the propagation delay of delay line 103 does not precisely correspond to the interpulse period, imperfect time alignment occurs and complete cancellation of the clutter in combiner 104 is prevented.

Previous IF clutter cancellers have used surface acoustic wave (SAW) delay lines and bulk acoustic wave (BAW) delay lines. The signal going through the delay line, however, always propagates through a different signal path than does the non-delayed signal. One reason that these clutter cancellers have not seen widespread use is that the effects of temperature, ageing, manufacturing tolerances, and other factors affecting phase and delay are different on the two paths. Clutter cancellers utilizing different signal paths, therefore, achieve only limited clutter cancellation and limited long term stability. Another problem with these clutter cancellers involves the fact that the delays of their delay lines are fixed and not programmable. The use of these clutter cancellers in radar systems which use several different interpulse periods requires that a separate delay line be provided for each different interpulse period used. This type of clutter canceller has therefore not found widespread use.

A new device called an acoustic charge transport (ACT) delay line has recently been developed. The ACT device utilizes a combination of surface acoustic wave (SAW) technology and field effect transistor (FET) technology to affect a monolithic GaAs RF delay line. The ACT is basically a four terminal device in its most fundamental form. The ACT detailed in FIG. 3 has a sampler drive signal input D1, an input signal input A1T1, an interrupt field input INT1, and one or more output taps A1T2.

When a high power, constant frequency RF signal is applied to sampler drive signal input D1, a traveling electric field is piezoelectrically induced by a SAW on the surface of the GaAs substrate. Each potential "well" or lowpoint of the traveling electric field causes a sample of the signal on input signal input A1T1 to be pushed into FET channel F1. Accordingly, when an IF radar signal is applied to the signal input, each potential well causes an electron packet to be formed whose total electric charge is proportional to the instantaneous amplitude of the IF radar signal. These charge packets are carried through FET channel F1 at the fixed acoustic velocity (2864 meters/sec) of the transporting SAW. Output taps A1T2 overlapping FET channel F1 are used to sample the propagating charge packets nondestructively. A tap senses the electron density of a charge packet near it by sensing the electric field produced by the charge packet. In summary, a series of charge packets representing the amplitude of the IF signal over time are serially loaded into and moved through the FET channel at a fixed acoustic velocity.

Not only are ACT devices useful in building delay lines and filters, ACT devices can also be used in fashioning analog memories. A stationary electric field can be induced via interrupt field input port INT1 so that the traveling electric field of the SAW is overridden. If an IF input signal is sampled with the SAW generated propagating potential wells and if an overriding stationary electric field is then applied, the samples are held in a fixed position within the FET channel. It is possible to hold the packets in a fixed position for a relatively long period of time (up to milliseconds or seconds). Upon removal of the stationary electric field, the propagating SAW potential wells continue to move the charge packets through the FET channel as before. In this manner, the device forms a programmable delay line. Because the starting time and the duration of the interrupt stationary electric field can be locked to the radar system clock under digital control, the use of ACTs in clutter cancellers could provide precise stability and control.

If an ACT could be produced which could store an entire interpulse period, the ACT device could perform the function of the single pole clutter canceller depicted in FIG. 1. Unfortunately, the longest ACTs available have a FET channel length equivalent to 3 to 5 microseconds when typical interpulse periods range from 20 microseconds to 1000 microseconds.

SUMMARY OF THE INVENTION

This invention combines SAW delay lines and Acoustic Charge Transport (ACT) delay lines to form a delay-stable IF clutter canceller whose delay is programmable. A SAW delay line with multiple taps time demultiplexes the SAW input signal into multiple signals (serial to parallel output). Each of these signals is the SAW input signal delayed by a different amount.

A series of ACT devices, one attached to each SAW output tap, simultaneously samples a separate segment of time within the interpulse period. Each of the ACT devices has a FET channel whose acoustic length is equal to the amount of time required for the SAW's traveling wave to travel between SAW device tap outputs. When the ACT FET channels are filled with charge sample packets, an entire interpulse period has been simultaneously stored. An interrupt field is then simultaneously applied to all of the ACT devices to hold the sample packets in the ACTs.

Note that if the SAW has enough SAW taps and if enough ACT FET devices are used, an entire interpulse period worth of packets is simultaneously stored. Usually, however, only a portion of the interpulse period is of interest. Therefore, only a portion of the interpulse period need be stored in the ACTs. Each ACT device, for example, stores about a 5 microsecond interval of an interpulse period. A clutter canceller utilizing 20 ACT devices, therefore, features 100 microseconds of storage time in a typical 1000 microsecond interpulse period.

The charge packets are stored in the ACTs until the next interpulse period. The interrupt field is then removed and the charge packets move toward the output taps. Because the interrupt field is precisely controlled to hold the packets for exactly one interpulse period, the packets arrive at the ACT output terminals coincident in time with the same range position in the new interpulse period. When the interrupt field simultaneously releases all the ACTs, each individual ACT output is simultaneously subtracted from the current IF signal coming out of the associated SAW tap output. The result is that the non doppler-shifted signal component (clutter) in cancelled.

The outputs of the multiple subtraction circuits simultaneously enter the taps of a second tapped SAW delay line and are time multiplexed into a single serial IF signal (parallel to serial conversion).

One aspect of the invention is that both the stored signal from the first interpulse period and the signal from the next interpulse period are delayed through the same signal path through the same SAW device. It is true that both SAW delay and internal-ACT acoustic delay may vary in the present invention, but these changes occur slowly and will be negligible from one interpulse period to the next. Because these changes do not affect the decision of when to subtract, they cannot adversely affect clutter cancelling. Therefore, because both the ACT-stored signal and the non ACT-stored signal experience the same amplitude, delay, and phase perturbation, clutter cancellation is complete.

Another aspect of the invention is that the delay of the ACT itself is readily controllable to ensure complete cancellation of the clutter. A single programmable clutter canceller also accommodates systems in which multiple interpulse periods are used. Where prior art clutter cancellers have involved unstable delay dependent methods of determining when to subtract, this invention provides for the incorporation of a controlling circuit to determine when to subtract. The controlling circuit can be made to be a precise timing device which is locked to the system clock and which is environment independent to the desired degree.

Unlike prior art schemes, environmental effects on the delay of the SAWs do not significantly affect the clutter cancelling of this invention. In prior art unstable delay dependent methods of determining when to subtract interpulse periods have been used. This invention provides for the incorporation of a controlling circuit to determine when to subtract. The controlling device can be made to be a precise timing device which is environment independent to the desired degree.

BRIEF DESCRIPTION OF THE DRAWINGS

Other features of the present invention will become more fully apparent from the following detailed description of the preferred embodiment, the appended claims and the accompanying drawing in which:

FIG. 4 is a timing diagram of the ACT storage and retrieval process.

DETAILED DESCRIPTION OF THE PREFERRED EMBODIMENT

Figure 2:
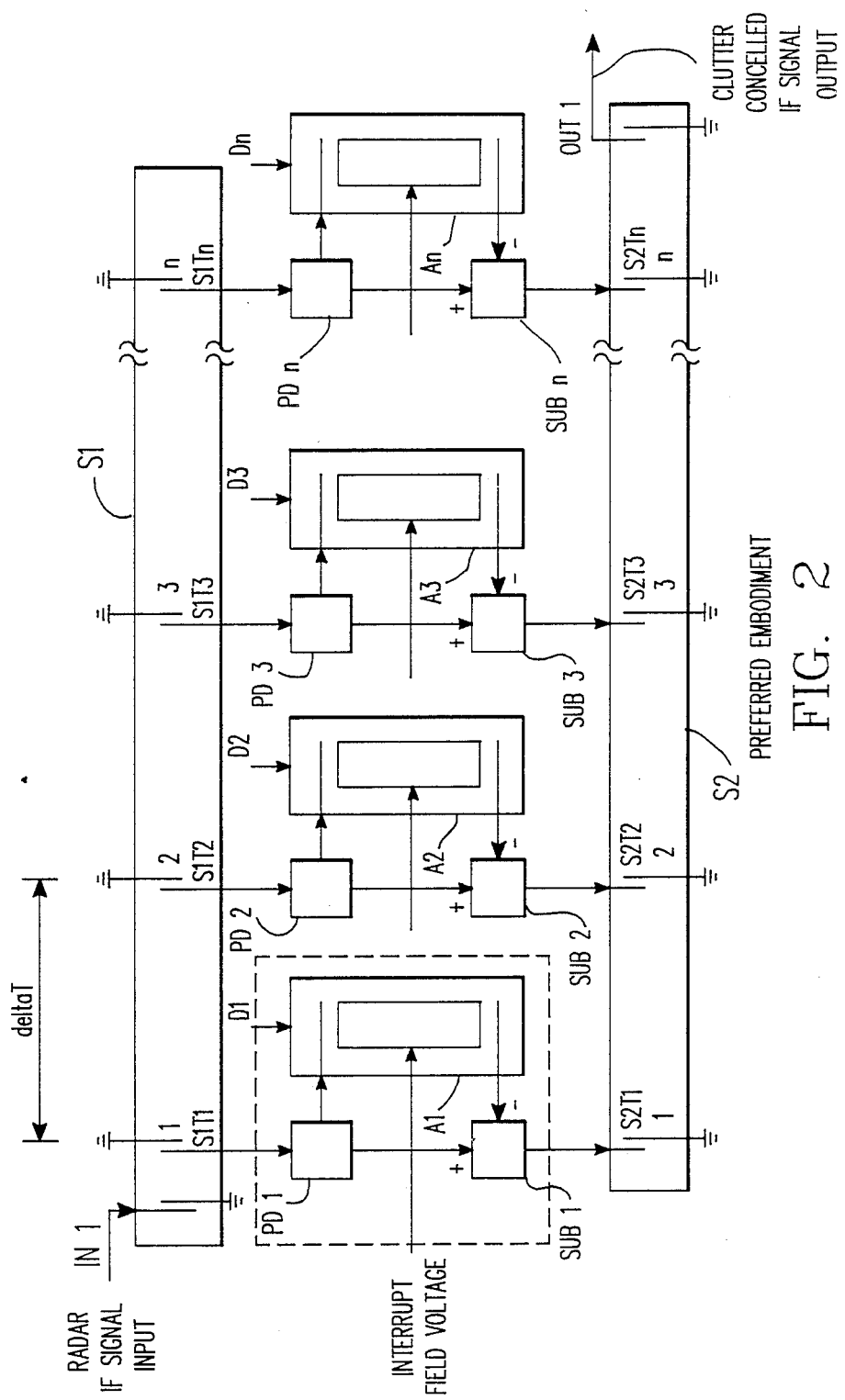
FIG. 2 is a diagram of the preferred embodiment of the invention.

The preferred embodiment of the present invention as shown in FIG. 2 has multiple sets of ACT devices and subtraction circuits. Only the first three of these sets is described. The remaining sets of ACT devices and subtraction circuits are connected in the same way. In the illustration, the total number of sets is represented by the variable n.

The radar IF input signal is input at terminal IN1 into a first SAW device S1. SAW device S1 has n taps. The surface acoustic wave induced by the IF input signal travels from left to right in SAW device S1. Taps S1T1, S1T2 and S1T3 are the first three of the n taps. The delay time between adjacent taps is defined as deltaT, a fixed value.

ACT devices A1, A2 and A3 are the first three of the n ACT devices. Taps S1T1, S1T2 and S1T3 of SAW device S1 are attached to the signal inputs of ACT devices A1, A2 and A3 respectively through power dividers PD1, PD2 and PD3 respectively. The drive signal inputs to A1, to A2 and to A3 are shown as D1, D2 and D3 respectively. The outputs of ACT devices A1, A2 and A3 are connected to subtraction circuits SUB1, SUB2 and SUB3 respectively. The taps of the first SAW device S1 are also attached to the subtraction circuits SUB1, SUB2 and SUB3 through power dividers PD1, PD2 and PD3 respectively. The ACTs, power dividers, and subtraction circuits may all be contained in a monolithic form on the GaAs substrate.

In operation, a sample period T of the interpulse period is divided into n time segments of equal length, deltaT, where: T=n(deltaT). SAW tapped delay line S1 of FIG. 2 has n taps spaced deltaT apart. DeltaT is a period of time equal to the difference in SAW S1 propagation time from IN1 to the S1T2 tap minus the SAW S1 propagation time from IN1 to the S1T1 tap.

The length of the ACT FET channel is chosen so that the uninterrupted propagation delay through the ACT SAW equals deltaT. Each ACT device continuously samples the IF output of its SAW S1 tap. Over a region within the interpulse period where clutter cancellation is desired, a stationary interrupt field INT1 is activated in the FET channel of all the ACT devices. This field overrides the SAW potential well propagation and effectively stores the charge packets until the same point in time during the next interpulse period.

Figure 1:
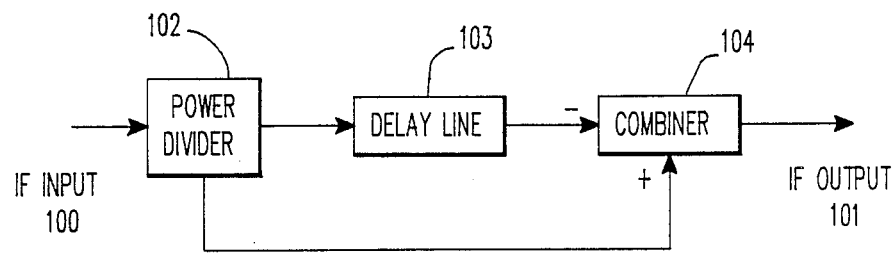
FIG. 1 (PRIOR ART) is a diagram of a single pulse clutter canceller.
Figure 3:
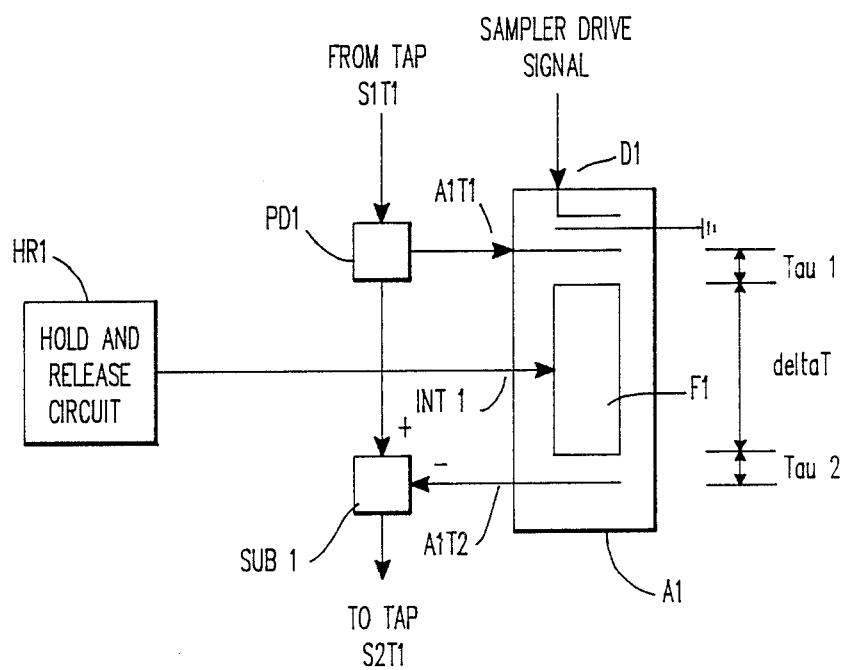
FIG. 3 is a detail of the dashed box in FIG. 2.

FIG. 3 shows the association of some of the ACT timing parameters to the hardware detailed in the dashed box of FIG. 2. As can be seen in FIG. 3, an input pedistal delay of tau1 exists from the time an electron packet sample is taken at terminal A1T1 to the time it enters the storage region of FET channel F1. The storage length of the FET channel is defined as deltaT which corresponds to the SAW S1 tap spacing. It is within this FET channel that the interrupt field cause the ACT to store charge packets. An output pedistal delay tau2 exists from the time a packet exits the FET channel storage region to the time the ACT output signal appears on ACT output tap A1T2. The total propagation delay of the ACT is equal to the sum of tau1, deltaT and tau2. Tau1 and tau2 can be made relatively small (on the order of nanoseconds) and they need not necessarily be made equal. The interrupt field voltage supplied to FET channel F1 to store ACT input INT1, is generated by hold and release circuit HR1 (shown in FIG. 3 only) located outside the dashed box of FIG. 2. The point in time when hold and release circuit HR1 asserts and releases the interrupt field is determined by radar system timing parameters such as the radar system clock and interpulse period time marks.

FIG. 4 is a timing diagram of clutter cancellation of two interpulse periods. Time moves from left to right in the diagram. Two interpulse periods are shown. The first interpulse period follows the first transmit pulse interval 400. The second interpulse period follows the second transmit pulse interval 401.

At a point in time 402 which is Tstart following the beginning of transmit pulse interval 401, clutter cancellation for a time segment of T=n(deltaT) is begun. SAW tapped delay line S1 time demultiplexes interval T so that the n deltaT segments exit SAW S1 in parallel. At time 405, t=Tstart+n(deltaT)+tau1 after transmit pulse interval 400, each ACT has its deltaT segment of the T interval in its FET channel storage region. Interrupt field 403 is then introduced simultaneously to all the ACT devices to hold the packets in the ACT FET channels. In FIG. 4, the interrupt field's being asserted is depicted as interrupt field voltage 403 being high.

The interrupt field is removed at a time 404, Tstart+(n−1)(deltaT)−tau2 after the beginning of the transmit pulse interval of the next interpulse period. This allows tau2, the output pedistal delay, for the packets exiting the ACT FET to reach the outputs of the ACT devices. The n ACTs output the stored signal exactly one interpulse period after receiving the signal. The outputs of the n ACTs coincide in time with the SAW S1 tap outputs so that clutter cancellation of n parallel deltaT time segments occurs. While the subtraction is taking place, the ACT is also sampling the SAW tap outputs getting ready for storage and cancellation with the next interpulse time period.

Because n clutter cancelled deltaT time segments come out in parallel, it is desirable to perform a parallel-to-serial, time multiplexing operation to produce a single continuous IF output channel. SAW S2 with n input taps spaced deltaT apart performs this operation and a single output signal appears on SAW2 output OUT1. Having a single IF output channel is desirable because less down conversion and A/D conversion hardware is required for interface with the system processor. In some cases, however, it may be desirable to eliminate SAW2 and process each cancelled segment in parallel.

Note that both the stored interpulse period and the interpulse period that is subtracted from it pass through the same path in delay element SAW S1. With respect to one deltaT time segment, the stored interpulse period signal enters SAW S1 at terminal IN1, is delayed, exits SAW S1 at tap SIT1, passes through power divider PD1, is stored in ACT A1, and is supplied to subtraction circuit SUB1. The subtracted interpulse period signal also enters SAW S1 at terminal IN1, is delayed by the same path in SAW S1, also exits SAW S1 at tap S1T1, passes through the same power divider PD1, and is supplied directly to subtraction circuit SUB1. As a result, variations in the delay characteristics within SAW S1 are identical for the two interpulse periods and do not affect clutter cancelling.

The power divider and the ACT constitute the only differences between the two signal paths. These two elements have almost no delay independent of the control of the interrupt field (delays tau1 and tau2 can be made relatively small, on the order of nanoseconds). Adjustments in timing can also be made to compensate for tau1 and tau2.

While my invention has been disclosed in connection with the preferred embodiment, it should be understood that there may be other embodiments which fall within the spirit and scope of the invention as defined by the following claims.

I claim:

1. An apparatus for cancelling clutter in an input signal having first and second interpulse periods, comprising:
   serial-to-parallel means for time-demultiplexing the input signal into two or more derivative signals which are delayed differing amounts with respect to said input signal, wherein said serial-to-parallel means comprises a surface acoustic wave (SAW) device;
   multiple storage means, one associated with each of said derivative signals, for separately storing a portion of each of said derivative signals during the first interpulse period and for releasing said stored portions of said derivative signals later during the second interpulse period;
   multiple combining means, one connected to each of said storage means, for subtracting the input from the output of each of said storage means; and
   parallel-to-serial means for time-multiplexing the outputs of said combining means to form a single output signal.

2. An apparatus for cancelling clutter in an input signal having first and second interpulse periods, comprising:
- serial-to-parallel means for time-demultiplexing the input signal into two or more derivative signals which are delayed differing amounts with respect to said input signal;
- multiple storage means, one associated with each of said derivative signals, for separately storing a portion of each of said derivative signals during the first interpulse period and for releasing said stored portions of said derivative signals later during the second interpulse period;
- multiple combining means, one connected to each of said storage means, for subtracting the input from the output of each of said storage means; and
- parallel-to-serial means for time-multiplexing the outputs of said combining means to form a single output signal, wherein said parallel-to-serial means comprises a surface acoustic wave (SAW) device.

3. An apparatus for cancelling clutter in an input signal having first and second interpulse periods, comprising:
- serial-to-parallel means for time-demultiplexing the input signal into two or more derivative signals which are delayed differing amounts with respect to said input signal;
- multiple storage means, one associated with each of said derivative signals, for separately storing a portion of each of said derivative signals during the first interpulse period and for releasing said stored portions of said derivative signals later during the second interpulse period, wherein each of said multiple storage means comprises an acoustic charge transport (ACT) device;
- multiple combining means, one connected to each of said storage means, for subtracting the input from the output of each of said storage means; and
- parallel-to-serial means for time-multiplexing the outputs of said combining means to form a single output signal.

4. The apparatus of claim 3 wherein:
- each storage means of said multiple storage means comprises a power divider for inputting a derivative signal from said serial-to-parallel means, outputting the derivative signal to said ACT device, and outputting the derivative signal to said combining means.

5. The apparatus of claim 3 further comprising:
- digital control means for controlling the timing of said storing in said multiple storage means and said releasing from said multiple storage means, the digital control means causing said storing to occur by causing an interrupt field to develop in said ACT devices, the digital control means causing said releasing to occur by removing the interrupt field in said ACT devices.

6. The apparatus of claim 5 wherein said digital control means comprises means for:
- causing said interrupt field to develop a first amount of time into the first interpulse period,
- determining when a second amount of time into the second interpulse period has expired, the second amount of time being equal to said first amount of time minus the total propagation delay through one of said ACT devices, and
- causing said interrupt field to be removed when said second amount of time into the second interpulse period has expired.

7. The apparatus of claim 5 wherein:
- said digital control means comprises a microprocessor.

8. An apparatus for cancelling clutter in an input signal having first and second interpulse periods, comprising:
- serial-to-parallel means for time-demultiplexing the input signal into two or more derivative signals which are delayed differing amounts with respect to said input signal;
- multiple storage means, one associated with each of said derivative signals, for separately storing a portion of each of said derivative signals during the first interpulse period and for releasing said stored portions of said derivative signals later during the second interpulse period;
- multiple combining means, one connected to each of said storage means, for subtracting the input from the output of each of said storage means; and
- parallel-to-serial means for time-multiplexing the outputs of said combining means to form a single output signal;
- wherein the apparatus is built on a single monolithic semiconductor chip.

9. A method of cancelling clutter in an input signal comprising the steps of:
- time-demultiplexing said input signal into two or more derivative signals with a surface acoustic wave device such that said derivative signals are delayed differing amounts with respect to said input signal;
- storing each of said derivative signals with an acoustic charge transport device;
- subtracting each of said derivative signals from the previously stored portion of said particular derivative signal such that two time slices of each of said derivative signals are subtracted from each other; and
- time-multiplexing said subtracted derivative signals with a surface acoustic wave device to form a single output signal.

* * * * *